Nov. 7, 1961    H. C. ANDERSON    3,007,277
ELECTRIC RAT TRAP
Filed Sept. 8, 1959    3 Sheets-Sheet 1
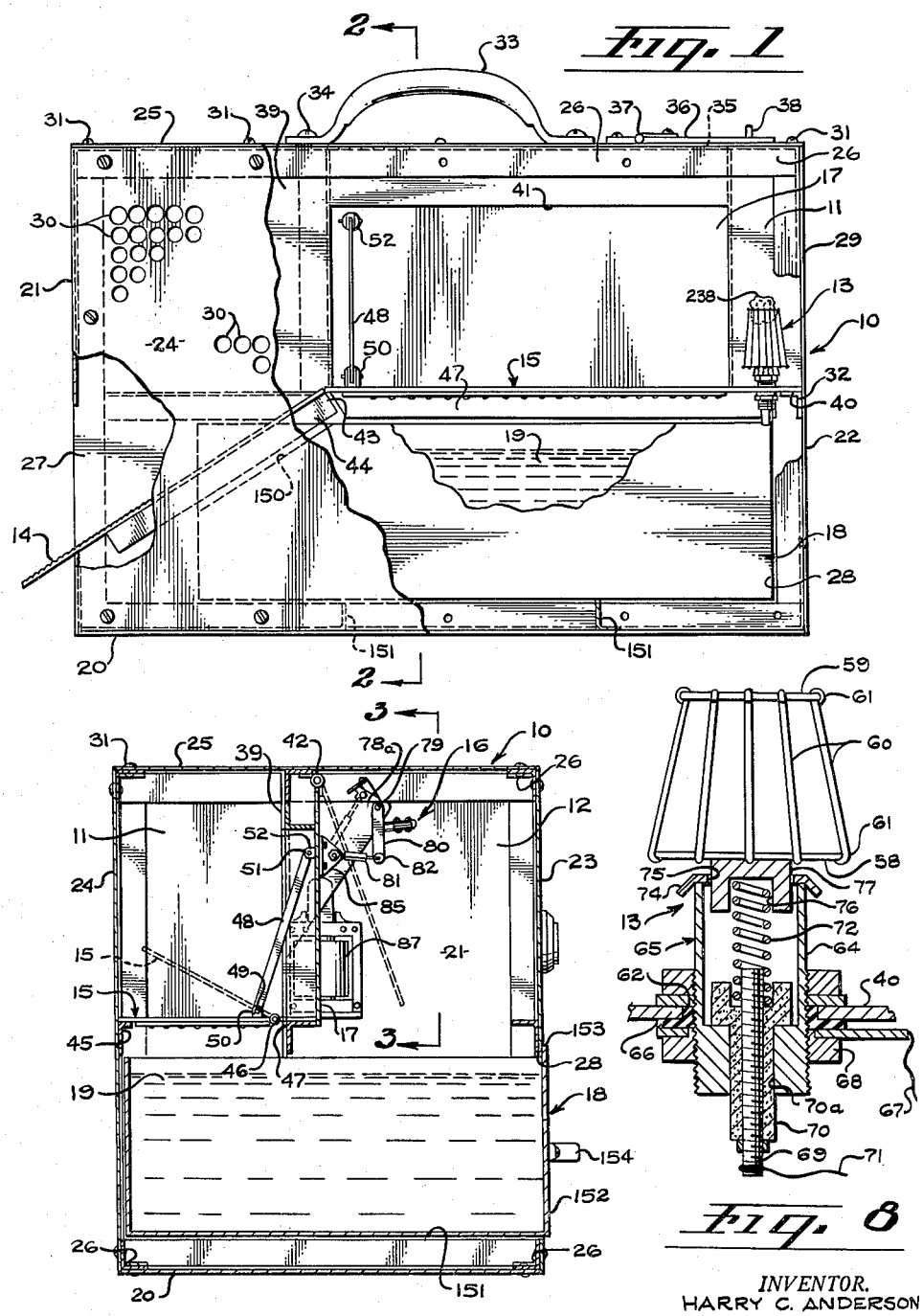
INVENTOR.
HARRY C. ANDERSON
BY
ATTORNEYS

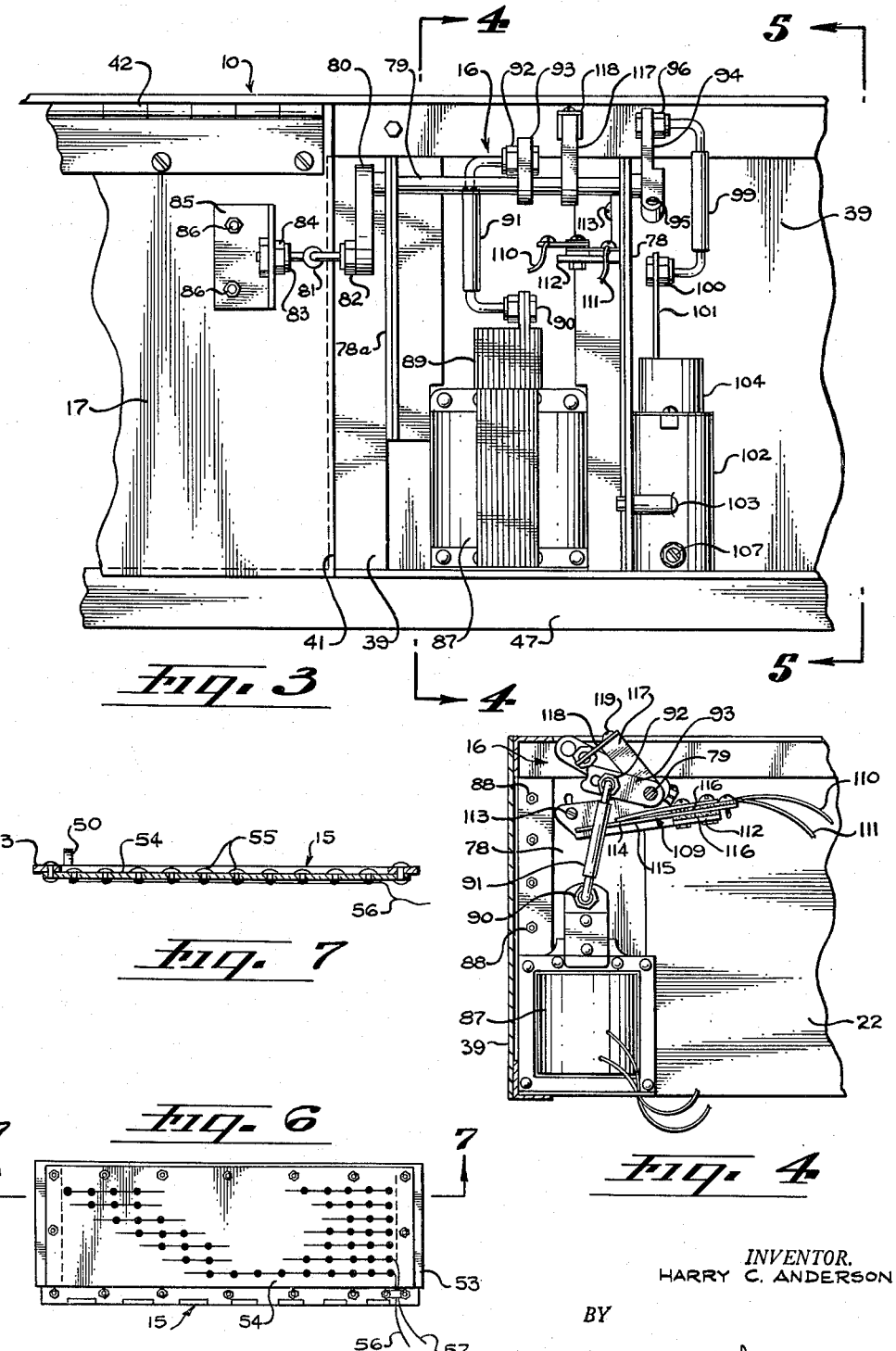

Nov. 7, 1961     H. C. ANDERSON     3,007,277
ELECTRIC RAT TRAP

Filed Sept. 8, 1959     3 Sheets-Sheet 3

INVENTOR.
HARRY C. ANDERSON
BY
Beehler & Shanahan
ATTORNEYS

United States Patent Office 3,007,277
Patented Nov. 7, 1961

3,007,277
ELECTRIC RAT TRAP
Harry C. Anderson, deceased, late of Hollywood, Calif., by Bonnie B. Anderson, legal representative, North Hollywood, Calif., assignor to Duane L. Morgan, North Hollywood, Calif.
Filed Sept. 8, 1959, Sept. 838,646
1 Claim. (Cl. 43—99)

This invention relates generally to an improved animal trap, and is particularly concerned with apparatus adapted for the destruction of rodents.

Though several types of rodent traps have heretofore been suggested, most of these types have proved progressively less effective after the killing of one or more animals, since the presence of the bodies of previously killed rats is detected by sight or smell and serves as a warning to deter other animals from entering. A major object of the present invention is to provide a trap adapted to completely disintegrate the body of each rodent encountered, to thereby destroy all evidence which might otherwise render later comers more cautious. This may be accomplished by ejection of the animal into a bath of disintegrating liquid, so constituted as to completely dissolve or decompose the body.

Since certain vermin carried by rodents are undesirable in themselves, a further object of this invention is to destroy and preferably disintegrate any such vermin carried by a trapped animal. This is best accomplished by placing the body of the animal in a disintegrating bath while the body is still warm, that is, before the vermin have left.

In addition to the above, the inventor was particularly concerned with the development of novel apparatus for killing rodents with absolute certainty and in a minimum of time. For this purpose, the inventor employed means for inducing an animal to a predetermined location, together with means for electrocuting him upon arrival at that location. Preferably, the killing apparatus comprises an electrified platform which may be automatically energized in response to the presence of an animal. To effect this energization, there may be disposed in the vicinity of the platform or other electrocuting means a control element adapted to close the circuit to a pair of electrocuting contacts upon movement of the element by the animal. The inventor found most effective the employment of a switch operable to close the electric circuit upon movement of a bait holder toward which the animal is induced.

The invention additionally discloses novel means for removing the body of an animal from the location at which electrocution occurs to a second location. This moving mechanism preferably comprises means for ejecting the animal from an electrocuting chamber to the previously described disintegrating bath, after electrocution has been completed. Desirably, the platform itself is operable to eject the rat in a predetermined direction in delayed relation to energization of the electrocuting circuit. A wall section in the electrocuting chamber may open simultaneously with the ejecting operation of the platform to permit ejection of the animal through a normally closed area.

An additional object of the invention is to provide an electrical control circuit for automatically energizing the electrocuting means and ejecting means in the defined delayed relation.

The above and further features and objects of the present invention will be better understood from the following detailed description of the typical embodiment illustrated in the accompanying drawings, in which:

FIGURE 1 is a side elevational view of the trap, partly broken away to show the interior arrangement;

FIGURE 2 is a vertical section taken on line 2—2 of FIGURE 1;

FIGURE 3 is a fragmentary transverse section of the trap taken on line 3—3 of FIGURE 2;

FIGURE 4 is an enlarged fragmentary view of the ejecting mechanism, taken on the line 4—4 of FIGURE 3;

FIGURE 6 is a view of the underside of the electrocuting plate;

FIGURE 7 is a transverse section taken on line 7—7 of FIGURE 6;

FIGURE 8 is an enlarged fragmentary vertical section through the bait holder;

Figure 9:
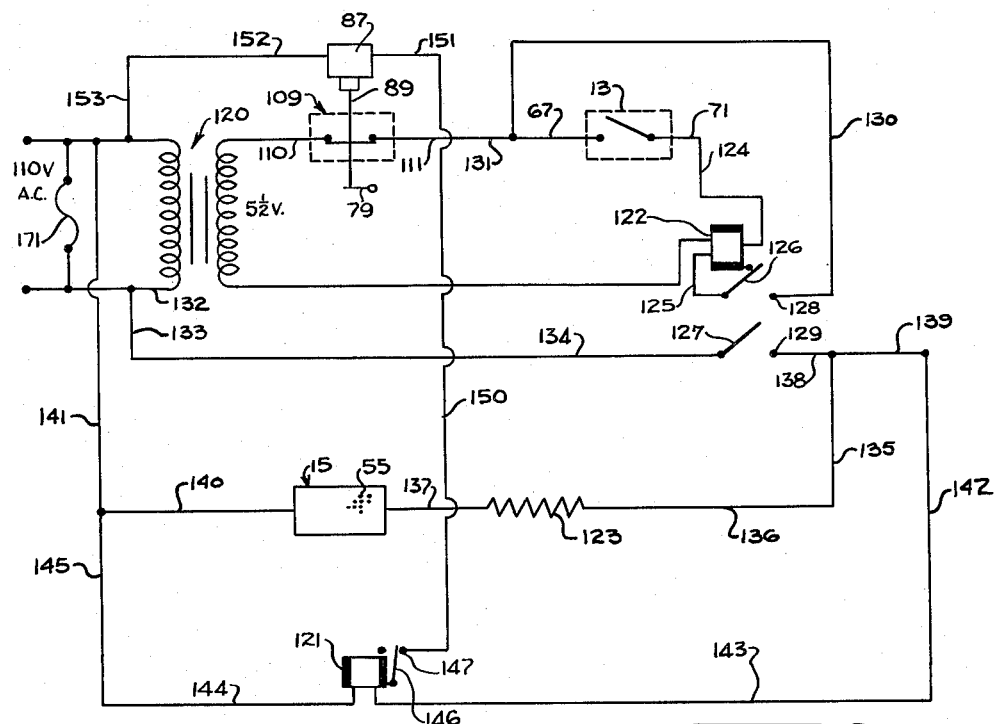
FIGURE 9 is a diagrammatic representation of the control circuit for the trap.

Referring first to FIGURES 1, 2 and 3, the operating mechanism of the trap is illustrated as contained within a rectangular housing 10, divided interiorly by vertical partition 39, ramp 14, and floor section 15, into electrocuting chamber 11 and main chamber 12. The mechanism includes generally bait holder 13 for inducing a rodent into the trap, platform or floor section 15 in chamber 11 upon which the animal is electrocuted, movable wall section 17 in partition 39 between chambers 11 and 12, container 18 within chamber 12 and adapted to hold dissolving or disintegrating liquid 19, and ejecting mechanism 16 for automatically opening the wall section and pivoting the platform after electrocution (see FIGURE 3) to eject the animal into liquid 19.

Housing 10 comprises bottom 20, front and rear walls 21 and 22, side walls 23 and 24, and removable cover 25. The bottom and side walls may be secured together in any suitable manner and reinforced by angle irons 26 at their intersections. Opening 27 in front wall 21 affords an entrance for the rodent from which he may ascend inclined ramp 14 onto platform 15. Side wall 23 contains rectangular opening 28, within which container 18 is receivable and through which the container may be removed. Rear wall 22 may be perforated at 29 in the vicinity of bait holder 13, and side wall 24 may be similarly perforated at 30 to permit easy detection of the bait by an animal outside the trap.

Cover 25 is secured to the upper angle iron 26 as by screws 31 receivable in the angle iron. Handle 33 is secured centrally to the cover by screws 34, and renders the trap easily portable. Opening 35 in the cover above the bait holder is normally closed by door 36, which is hinged to the cover at 37 and may be opened by handle 38 for refilling holder 13 with bait.

Container 18 is of open top rectangular configuration except beneath the ramp, where its forward wall 150 is angularly disposed to permit adequate clearance from the ramp. The container is slidable into position upon spaced supports 151. The outer side 152 of the container which carries handle 154, peripherally engages side 23 of the trap at 153 when in operative position.

Rectangular opening 41 is formed in partition 39 adjacent electrocuting platform 15, to provide a passage through which the animal may be ejected after electrocution. Wall section 17, which normally closes opening 41, is hinged at 42 for pivotal opening movement away from the electrocuting chamber.

It is important to provide perforations like the perforations 30 in the wall 24 and perforations 29 near the bait holder so that the interior of the box is lighted to a degree and therefore not dissuade the rat from entering.

Electrocuting platform 15 is supported at its forward end by horizontally disposed upper extremity 43 of ramp support 44. Rearwardly, the platform is supported by angle iron 32. A portion 40 of the platform serves as a base for the bait holder. At the outside, platform 15 is carried by the horizontal flange of angle iron 45, which is suitably secured to wall 24 of the housing. The other side of the platform is hinged at 46 to longitudinally extending frame member 47 in a manner permitting upward pivotal movement of the platform to the dotted line position of FIGURE 2. Connecting link 48 is pivotally secured at 49 to projection 50 which extends upwardly from the platform, and at 51 to projection 52 extending laterally from wall section 17. Thus, pivotal movement of section 17 about hinge 42 induces a corresponding pivotal movement of platform 15 about hinge 46.

The platform is formed of a peripheral rectangular frame member 53 (see FIGURES 6 and 7) and a nonconducting plate 54 secured to the under side of member 53. Contacts 55 are secured to plate 54 at spaced locations over substantially its entire area and are upwardly exposed for engagement by an animal located on the platform. Electricity is conducted to the contacts by wires 56 and 57, which are illustrated as being connected to alternate rows of contacts.

Holder 13 is adapted to contain bait 238 for inducing an animal up ramp 14 onto platform 15, but acts also as a control element or switch for automatically energizing the platform to electrocute the animal upon movement of the holder by the animal. Referring to FIGURE 8, the bait holder comprises a cage having a bottom 58, an upper ring 59 and wire-like side members 60 secured at either end to the bottom and upper ring by terminal loops 61. Base 40 contains circular opening 62, within which a body 64 is receivable. Insulating washer 66 is disposed about the body beneath base 40. Lead 67 is applied about the lower threaded portion of body 64 beneath washer 66, and the body 64 of member 65 is then rigidly retained in the illustrated upstanding position by application of nut 68 to its lower end. Annular electrical conducting cap 74, containing central opening 75, is carried on the upper end of member 65. Coil spring 72 is retained centrally within member 65 in an upwardly extending position by insulating sleeve 70 which fits tightly in a bore 70a of the body 64. A screw 69, about which lead 71 is secured, extends upwardly within the spring 72 to retain its coils tightly against the inner surface of sleeve 70 and thus secure the spring rigidly in the illustrated position. The upper ends of spring 72 is receivable within bore 76 in projection 77 which depends from bottom 58 of the bait holding cage. Thus, the cage is easily deflectible in any horizontal direction by virtue of its support upon spring 72. Such deflection in any direction will place the outer surface of projection 77 in contact with cap 74 to close the electrical circuit across leads 67 and 71. Closing of the circuit operates to complete a control circuit which energizes previously mentioned leads 56 and 57 to the platform in a manner later to be described, for electrocution of an animal on the platform.

The ejecting mechanism, generally indicated at 16, operates to pivot wall section 17 and platform 15 to the broken line positions of FIGURE 2 a predetermined length of time after energization of electrocuting contacts 55, to thereby eject the electrocuted animal from the chamber into disintegrating liquid 19. Mechanism 16 includes a pair of supports 78 and 78a extending laterally from partition 39 and containing alined openings within which shaft 79 is rotatably carried. Arm 80 (see FIGURE 3) is rigidly secured to the rearward end of shaft 79 and is pivotally connected, at its outer end, to link 81 through bearing 82. The other end of link 81 is pivotally retained at 83 by bearing 84, which is secured through support 85 to wall section 17, as by screws 86. Through this linkage, rotation of shaft 79 is effective to pivot wall section 17, which in turn pivots platform 15, as previously described.

Figure 5:
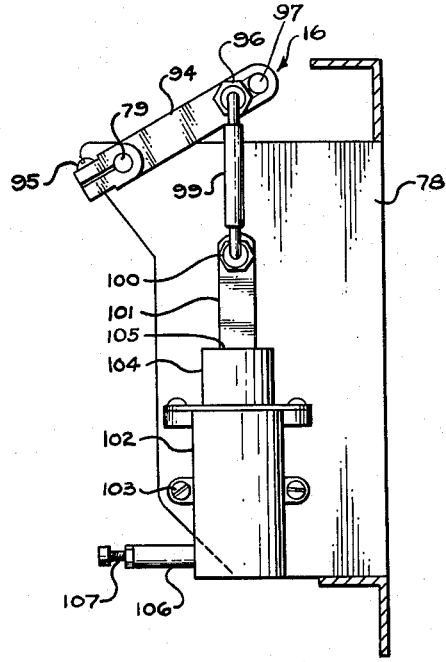
FIGURE 5 is a transverse section taken on the line 5—5 of FIGURE 3.

Solenoid 87, secured to partition 39 above longitudinally extending frame member 47 is employed for rotating shaft 79 to effect the above described ejecting action. Armature 89, associated with the solenoid, is pivotally connected through bearing 90 to one end of link 91. The other end of this link is pivotally retained within bearing 92 on arm 93, which is rigidly secured to shaft 79. Thus, upon energization of the solenoid, armature 89 is drawn downwardly to rotate the shaft through link 91. The forward end of shaft 79 rigidly carries arm 94, which is illustrated as secured to the shaft by clamping screw 95 (see FIGURE 5). The outer end of this arm carries bearing 96, whose exact position along the arm may be varied by virtue of slot 97 within which the bearing is secured. Link 99 is pivotally retained at its upper end within bearing 96 and at its lower end within bearing 100, which is carried at the upper extremity of piston rod 101. Air cylinder 102 is secured, as by a pair of screw bolts 103 to support 78 and operates to cushion rotation of shaft 79 and thus prevent too rapid operation of the ejecting mechanism. To carry out this purpose, piston 104, to which the piston rod is connected at 105, is movable within the cylinder only as rapidly as air can pass through vent 106 to the atmosphere. Needle valve 107 permits regulation of the venting capacity of passageway 106, and thus allows for regulation of the cushioning effect of the cylinder.

Electrical equipment whose exact nature will later be brought out during discussion of the control circuit is diagrammed in FIGURE 9. It is operable upon movement of the bait holder to sequentially energize the electrocuting platform and the ejecting mechanism in delayed relation. Switch 109 (see FIGURE 9) is operable, upon completion of the ejecting motion, to open the electrical control circuit, which includes leads 110 and 111, to restore the entire circuit to normal condition. Switch 109 is carried by support 112, which is secured by screws 113 to support 78. Leads 110 and 111 are connected to a pair of contacts 114 and 115, which are spaced from each other and from the support by insulating layers 116. Arm 117, rigidly carried by shaft 79, carries non-conducting contact engaging element 118, which is secured by screw 119. As will be readily understood, rotation of shaft 79 causes element 118 to deflect contact 115 downwardly and out of engagement with contact 114 to thereby break the control circuit.

FIGURE 9 illustrates the wiring diagram of the trap, as adapted for operation from a 110 volt alternating current supply fused at 171. The arrangement includes, among other units, a transformer 120 to reduce the voltage from 110 volts to approximately 5½ volts for energizing a low voltage control circuit. Delay relay 121 is employed to close the circuit to the ejecting solenoid 87 a predetermined length of time after energization of the electrocuting platform.

It has been discovered that a voltage of 110 volts is sufficient to cause burning of the flesh of a rodent, and therefore would, if employed as an electrocuting voltage, leave traces of the destroyed animal on contacts 55. Consequently, the inventor employs a voltage dropping resistor 123 for reducing the electrocuting voltage from 110 volts to 87½ volts.

When the trap is to be placed in operation, the bait holder 13 is filled with suitable bait and inserted through the hand hole 35 into the illustrated position. The bait induces the rodent to ascend ramp 14 onto platform 15, where his feet engage certain of the contacts 55. In reaching for the bait while on the platform, he engages and moves holder 13 to close the circuit from the low voltage side of transformer 120 to 5½ volt relay 122 through line 110, switch 109, line 111, line 67, bait holder 13, line 71, line 124, relay 122 and line 125 (see FIGURE 9). Resultant energization of relay 122 moves arms 126 and 127 into engagement with contacts 128 and 129 respectively. Arm 126 closes a holding circuit including lines 130 and 131 to shunt across bait holder switch 13 and maintain the low voltage circuit to relay 122 closed even after opening of the bait holder switch until the circuit is broken elsewhere. Arm 127 simultaneously closes the 87½ volt circuit to electrocuting platform 15 through lines 132, 133 and 134, arm 127, lines 138 and 135, line 136, the lower portion of resistor 123, and lines 137, 140 and 141. Thus, immediately upon movement of bait holder 13 in any direction, the contacts of platform 15 are energized to electrocute the animal.

Movement of contact 127 also closes a 110 volt circuit to delay relay 121 through lines 132, 133 and 134, arm 127, lines 138 and 139, and lines 142 and 143 and then through relay 121 and lines 144, 145 and 141. A predetermined length of time after energization, relay 121 operates to draw arm 146 into engagement with contact 147. The delay period is of sufficient duration to assure electrocution of the animal prior to ejection. Such movement of arm 146 closes the energizing circuit to solenoid 87 through lines 132, 133 and 134, arm 127, lines 138, 142, 143, the relay 121, arm 146, lines 150, 151, the solenoid 87, lines 152 and 153. This moves armature 89 to rotate shaft 79 by virtue of link 91 and arm 93. Such rotation of the shaft opens wall section 17 through arm 80 and link 81, and simultaneously pivots platform 15 upwardly through link 48 to eject the electrocuted animal from the platform through the space normally closed by wall section 17 and into liquid 19 within container 18. In this manner, the animal, after having been electrocuted, is displaced into a disintegrating liquid which dissolves his body and any vermin carried by the body. As previously described, air cylinder 102 serves to cushion the ejecting action by resisting shaft rotation which, through arm 94, link 99 and rod 101, moves piston 104 within the cylinder.

As the shaft reaches the limit of its ejecting rotation, non-conducting element 118, carried by arm 117 engages contact 115 of switch 109 to move that contact from engagement with contact 114 and open the low voltage control circuit through leads 110 and 111 at switch 109. This de-energizes relay 112, to return the entire circuit to normal. In FIGURE 9, for convenience solenoid 87 is diagrammatically represented as disposed vertically, and switch 109 is represented as opened directly by movement of the armature rather than through arm 117 and element 118, as in the actual mechanism.

Although the inventor has herein shown and described his invention in what the inventor conceived to be the most practical and preferred embodiment, it is recognized that departures may be made therefrom within the scope of his invention, which is not to be limited to the details disclosed herein but is to be accorded the full scope of the claim so as to embrace any and all equivalent structures and methods.

Having thus described his invention, what the inventor claims as new and desires to secure by Letters Patent is:

A rodent trap comprising a housing having a bottom wall, a top wall, two side walls, and two end walls, a horizontal frame member extending to and between said end walls and disposed centrally of the housing, a horizontal platform pivotally connected to said frame member and extending from the frame member toward one of said side walls, a vertical partition extending from said top wall to said frame member, said platform and partition defining an electrocuting chamber in the housing and a main chamber extending below and along one side of said electrocuting chamber, means in said main chamber for containing a liquid below said electrocuting chamber, said partition having an opening formed therein for allowing a rodent to be moved from the electrocuting chamber to within the main chamber, a wall section pivotally mounted along the upper edge thereof to said partition and covering said opening, a link pivotally interconnecting said platform and said wall section and constructed and arranged to swing the wall section outwardly on its pivotal mounting with respect to the electrocuting chamber as the platform is swung upwardly on its pivotal mounting, one of said end walls having a rodent-admitting opening formed in the lower portion thereof, an inclined ramp leading from said rodent-admitting opening to said platform, an upwardly extending bait holder in said electrocuting chamber adjacent the other of said end walls and being pivotally mounted at its lower end for limited swinging movement from an inactive position in which the axis of the bait holder extends vertically, the platform having a plurality of spaced electrical contacts exposed in the upper surface thereof and electrically insulated from each other, power means operatively connected to said platform for swinging said platform and said wall section on their respective pivots, and an electrical circuit interconnecting said contacts and bait holder and said power means to energize said contacts in response to movement of said holder and to activate said power means for swinging said platform and said wall section on their pivots thereby to electrocute a rodent through said contacts when the rodent moves said bait holder and thereafter to eject the rodent from said electrocuting chamber to said means for containing a liquid.

References Cited in the file of this patent
UNITED STATES PATENTS

| | | |
|---|---|---|
| 1,001,400 | Hertzberg et al. | Aug. 22, 1911 |
| 1,115,695 | Leyson | Nov. 3, 1914 |
| 1,281,876 | Taylor | Oct. 15, 1918 |